Patented Nov. 22, 1949

2,488,904

UNITED STATES PATENT OFFICE 2,488,904

1-METHYL-5-AMINOACRIDINE AND PROCESS FOR PREPARING IT

John Edwin Rogers Falk, Waverton, near Sydney, New South Wales, Australia, assignor to Sterling Drug Inc., Wilmington, Del., a corporation of Delaware No Drawing. Application February 15, 1946, Serial No. 647,992. In Australia March 3, 1945

3 Claims. (Cl. 260—279)

This invention has relevance to improvements to the process for the preparation of 5-amino acridines from diphenylamine-2-carboxylic acids.

In the said 5-amino acridines which have the following general formula:

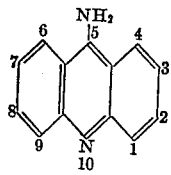

the acridine nucleus may be substituted in positions 1 to 4 and 6 to 9 as numbered above.

According to this invention, specifically, substituents in postions 1, 2, 3, 4, 6, 7, 8, 9 may be hydrogen or a substituent thereof. There are good yields of 5-amino acridine products by preparing these in accordance with the invention. Such preparation is exemplified generally by the following reaction:

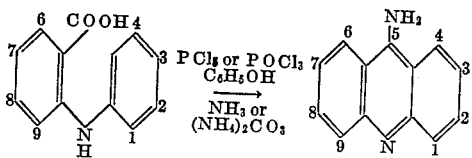

It is disclosed in the literature that such 5-amino compounds may be prepared by other methods to those disclosed herein and forming the subject-matter of this application.

However, by the literature published on the subject it is not disclosed that the preparation of the said 5-amino acridines has been accomplished in the one vessel without the isolation of either the 5-chloro or 5-phenoxy acridines, and that an inert solvent can be used in the preparation of 5-chloro acridine.

In this invention, the 5-amino acridines are prepared in the one vessel without the isolation of the 5-chloro- or 5-phenoxy acridines.

This is effected by reaction of phosphorus pentachloride or phosphorus oxychloride with diphenylamine-2-carboxylic acids or substituted diphenylamine-2-carboxylic acids in a solvent which will not react with the phosphorus halide, for example monochlorobenzene, removal of the solvent, addition of phenol, and finally addition of an alkaline substance such as sodium carbonate, to neutralize phosphorus acids formed during the reaction, together with ammonia or a substance or substances which will produce ammonia such as ammonium carbonate.

By way of illustration the following examples are given for the preparation of amino acridines according to the invention.

5-AMINO-ACRIDINE

Example 1

50 grams of diphenylamine-2-carboxylic acid are stirred with 125 cc. of monochlorobenzene, and 50 grams of phosphorus pentachloride (or 75 grams of phosphorus oxychloride) are added. The flask is connected to a suitable gas trap. When gas evolution ceases, about 95% of the chlorobenzene is distilled off at atmospheric pressure, the oil bath not being heated higher than 200° C. The bath is then cooled to 110° C., and 203.5 grams of phenol at 80° C. are added. Efficient mechanical stirring by any suitable means is necessary for the remainder of the reaction. The stirrer is fitted to the reaction vessel, and the oil bath cooled to 80° C., when 58.5 grams of finely powdered sodium carbonate are gradually added. A sample of the contents of the reaction vessel if now withdrawn should give a definite blue color to wet, red litmus. The bath is now at 76° C. 36 grams of powdered ammonium carbonate are now added as quickly as possible. The internal temperature is then raised quickly to 120° C. and maintained there for two hours with continual stirring.

The reaction vessel is then removed from the oil bath, the contents cooled to about 100° C., and the mixture poured into 300 cc. water in which has been dissolved 100 grams of sodium hydroxide. The precipitate is filtered off, washed free of phenol, and dissolved in 1200 cc. of water with just sufficient hydrochloric acid to make acid to litmus. The solution is then brought to pH 8 by adding sodium hydroxide solution, and the slight precipitate filtered off and discarded. The filtrate is made fully alkaline with sodium hydroxide solution, and the yellow precipitate of 5-amino-acridine filtered off, washed well with water and dried at 120° C. The yield is 40 grams (88%). M. P. 225° C. On crystallising once by Soxhlet extraction with acetone, the melting point is 232.5° C. (239.5° C. corrected) and the yield is 38 grams (83.5%).

1-METHYL-5-AMINO-ACRIDINE

Example 2

To 8 grams of 2-methyl-diphenylamine-2'-carboxylic acid in 20 cc. monochlorobenzene, 7.5 grams phosphorus pentachloride are added, and the method described in Example 1 abovementioned is followed. 9 grams of sodium carbonate are used for the neutralization mentioned. 5.4 grams ammonium carbonate are used for the amination. The pre-precipitation is carried out at pH 8.4, and the 1-methyl-5-amino-acridine precipitated is filtered off, and dried in the manner beforementioned. It may be crystallised either from benzene or 50% alcohol. Yield 4 gms., M. P. 192° C.

What I claim as my invention and desire to secure by Letters Patent is:

1. A process for preparing 1-methyl-5-amino-acridine which comprises reacting 2-methyl-diphenylamine-2'-carboxylic acid with phosphorus pentachloride, neutralizing the reaction mixture thus produced, aminating the neutralized reaction mixture and isolating 1-methyl-5-amino-acridine therefrom.

2. A process for preparing 1-methyl-5-amino-acridine which comprises reacting 2-methyl-diphenylamine-2'-carboxylic acid with phosphorus pentachloride, neutralizing the reaction mixture thus produced, aminating with ammonium carbonate the neutralized reaction mixture and isolating 1-methyl-5-amino-acridine therefrom.

3. 1-methyl-5-amino acridine

JOHN EDWIN ROGERS FALK.

REFERENCES CITED

The following references are of record in the file of this patent:

UNITED STATES PATENTS

| Number | Name | Date |
|---|---|---|
| 1,886,001 | Fehrle | Nov. 1, 1932 |

OTHER REFERENCES

Magidson et al., Berichte, vol. 66, pages 866–872 (1933).

Gleu et al., J. Prakt. Chem., vol. 153, pages 200–224 (1939).

Gerchuk et al., J. Gen. Chem. (USSR), vol. 11, pages 948–953 (1941) (cited in Chem. Obs., vol. 37, page 378; 1943).

Albert et al., J. Soc. Chem. Ind. (Transactions), vol. 60, pages 120–123 (May 1941).

Smith, "Organic Syntheses," vol. 22, pages 5–8 (John Wiley, New York 1942).